United States Patent [19]
Burrows et al.

[11] 3,944,518
[45] Mar. 16, 1976

[54] POLYAMIDES HAVING IMPROVED DYEABILITY AND THERMAL STABILITY

[75] Inventors: Harold George Burrows; Stephen John Hepworth, both of Manchester, England

[73] Assignee: Imperial Chemical Industries, Ltd., London, England

[22] Filed: June 15, 1966

[21] Appl. No.: 557,631

[30] Foreign Application Priority Data
June 23, 1965 United Kingdom............... 26596/65

[52] U.S. Cl. 260/45.75 C; 260/45.7 R; 260/45.7 P; 260/45.9 ND; 260/78 R; 260/78 L; 260/78 S; 260/78 SC
[51] Int. Cl.²............................................ C08G 6/00
[58] Field of Search....... 260/78, 78 L, 78 S, 78 SC, 260/45.9 NP, 45.75 C, 45.7 P, 45.7 R

[56] References Cited
UNITED STATES PATENTS

| | | |
|---|---|---|
| 2,510,777 | 6/1950 | Gray ...................................... 260/78 |
| 3,216,976 | 11/1965 | Schwartz et al. ...................... 260/78 |
| 3,235,534 | 2/1966 | Brinkman et al. ..................... 260/78 |
| 3,321,447 | 5/1967 | Kunde et al. .......................... 260/78 |
| 3,365,428 | 1/1968 | Wujciak................................. 260/78 |
| 3,376,258 | 4/1968 | Gysling et al. ........................ 260/78 |

OTHER PUBLICATIONS

Organo Phosphorus Monomers and Polymers, Gefter, 1962, PPX–XIII.

*Primary Examiner*—V. P. Hoke
*Attorney, Agent, or Firm*—Herbert M. Adrian, Jr.

[57] ABSTRACT

A method for improving the polymerization of polyamide compositions and the improved compositions formed thereby by polymerizing the polyamide in the presence of a small molar percent of a phosphonic acid salt of an organic diamine. The phosphonic acid salt increases the polymerization rate and results in a polymer of improved whiteness.

24 Claims, No Drawings

POLYAMIDES HAVING IMPROVED DYEABILITY AND THERMAL STABILITY

This invention relates to polyamides having improved properties, and to a process for the manufacture of the said polyamides.

According to the invention there is provided a process for the manufacture of polyamides which comprises polymerising a monoaminomonocarboxylic acid or lactum thereof having at least two carbon atoms between the amino and carboxylic acid groups, or substantially equimolecular proportions of a diamine which contains at least two carbon atoms between the amino groups and a dicarboxylic acid which contains at least two carbon atoms between the carboxylic acid groups, in the presence of from 0.1 to 10.0 molar per cent, based on the molecular weight of the recurring units of the polyamide chain, of a salt of an organic diamine with a phosphonic acid of the formula

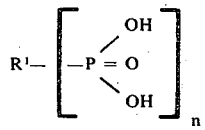

wherein $n$ is an integer of from 1 to 3, and $R^1$ is a mono-, di- or tri-valent organic radical depending on the value of $n$.

The said organic radicals represented by $R^1$, which are attached to the phosphorus atom through a carbon atom of said radical, are preferably mono-, di- or tri-valent aliphatic, cycloaliphatic, aryl, aralkyl or aralkenyl radicals, or such radicals in which a carbon atom is replaced by a hetero atom, in particular the nitrogen atom. The said aliphatic radicals are preferably mono-, di- or tri-valent alkane or alkene radicals containing up to 12 carbon atoms such as vinyl, methyl, ethyl, propyl, butyl, hexyl, octyl, decyl, dodecyl, ethylene, trimethylene, propylene, tetramethylene, hexamethylene and 1:3:5-pentyl radicals. The said cycloaliphatic radicals are preferably monovalent cyclohexyl and C-methylcyclohexyl radicals. The said aralkyl or aralkenyl radicals are preferably monovalent monocyclic lower alkyl or alkenyl radicals such as benzyl, β-phenylethyl and β-phenylvinyl radicals. The said aryl radicals are preferably mono-, di- or tri-valent benzene or naphthalene radicals such as phenyl, tolyl, 1- or 2-naphthyl, 1:4-naphthylene, 1:3- or 1:4-phenylene and 1:5:8-naphthylene radicals. Such aryl radicals can in addition contain other substituents such as chlorine atoms. As examples of the said radicals in which one of the carbon atoms is replaced by a nitrogen atom there may be mentioned radicals of 5- or 6-membered nitrogen containing heterocyclic rings such as the piperidino radical, and alkane radicals having one of the carbon atoms replaced by a nitrogen atom such as alkyl-NH-alkylene-radicals, for example the β-(ethylamino)ethyl radical.

The process of the invention can be carried out under the conditions normally employed for polymerising a polymerisable monoaminomonocarboxylic acid, or a lactam thereof, or for polymerising a mixture of a diamine and a dicarboxylic acid, or for polymerising a mixture of a polymerisable monoaminomonocarboxylic acid, a diamine and a dicarboxylic acid, the organic diamine salt of the phosphonic acid being added at any stage of the polymerisation process. It is however preferred to add the organic diamine salt of the phosphonic acid during the initial stages of the polymerisation and, above all, at the stage of charging the reactants to the polymerisation vessel.

When starting from an equimolecular proportion of a diamine and a dicarboxylic acid the said compounds can be used in the form of a salt of each other; thus, for example, hexamethylene diammonium adipate can be used instead of a mixture of equimolecular proportions of adipic acid and hexamethylene diamine.

The process of the invention is preferably carried out at a temperature between 200° and 400°C., until the required degree of polymerisation is obtained.

The process of the invention can be carried out by either a batch or dis-continuous process, or by a continuous process such as is described in British Specifications Nos. 886635, 924630 and 964822.

As specific examples of phosphonic acids which can be used in the form of salts with the organic diamines there may be mentioned methylphosphonic acid, ethylphosphonic acid, n-propylphosphonic acid, cyclohexylphosphonic acid, phenylphosphonic acid, β-phenylethylphosphonic acid, p-tolylphosphonic acid, p-chlorophenylphosphonic acid, 1:4-butane diphosphonic acid, 1:5-pentane diphosphonic acid, 1:4-cyclohexane diphosphonic acid, p-benzene diphosphonic acid, p-xylylene diphosphonic acid, 1:3:5-pentane triphosphonic acid and naphthalene 3:6:8-triphosphonic acid.

It is however preferred that the phosphonic acid is a phosphonic acid of the formula:

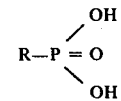

wherein R is a monovalent organic radical, preferably an alkyl, cycloalkyl, aralkyl or aryl radical, and above all a lower alkyl, a cyclohexyl, a monocyclic aryl lower alkyl or a monocyclic aryl radical.

Throughout this Specification the term "lower alkyl" is used to denote alkyl radicals containing from 1 to 4 carbon atoms.

The organic diamines which are used in the form of salts with the phosphonic acids may be any organic compounds which contain two primary, secondary or tertiary amino groups or a combination of such groups, such as piperazine, 1:4-diazabicyclo-(2:2:2)-octane, 4-dimethylaminopyridine, and 4-diethylaminopyridine, but more particularly aliphatic diamines in particular aliphatic diamines containing at least two, and preferably not more than 18 carbon atoms between the amino groups, such as trimethylenediamine, tetramethylenediamine, pentamethylenediamine and hexamethylenediamine. When the polyamide is being obtained by polymerisation of substantially equimolecular proportions of a diamine and a dicarboxylic acid, or a salt thereof, then it is preferred that the organic diamine which is in the form of the said salt with the phosphonic acid is the same as the diamine which is being polymerised with the dicarboxylic acid. Thus, for example, when a mixture of substantially equivalent amounts of hexamethylenediamine and adipic acid is being polymerised then it is preferred to use a salt of the phosphonic acid and hexamethylenediamine.

The salt of the phosphonic acid with the organic diamine can be the salt of either a half or one molecular proportion of organic diamine for each

group present in the phosphonic acid. Thus when $n$ has a value of 1 it can be either a salt of two molecular proportions of the phosphonic acid with one molecular proportion of the diamine, or a salt of one molecular proportion of the phosphonic acid with one molecular portion of the diamine. The organic diamine salt of the phosphonic acid can be added as such to the polymerisation mixture, or alternatively there can be added the requisite amounts of the phosphonic acid and of the organic diamine in which case the salt is formed in situ. As a further alternative when polymerising substantially equimolecular proportions of a diamine and a dicarboxylic acid only the phosphonic acid need be added, in which event the phosphonic acid forms a salt with part of the diamine which is to be polymerised, thus resulting in the formation of a polymer having a greater percentage of carboxy end groups compared with the amine end groups.

The amount of the organic diamine salt of the phosphonic acid which is to be added to the polymerisation mixture is preferably between 0.2 and 4.0 molar per cent based on the molecular weight of the recurring units of the polyamide chain.

As examples of the said polymerisable monoamino-monocarboxylic acids, or lactams thereof, there may be mentioned ε-aminocaproic acid, caprolactam 9-aminononanoic acid, 11-aminoundecanoic acid, 17-aminoheptadecanoic acid, dodecanolactam, capryllactam, enantholactam and pyrrolidone.

As examples of the said diamines there may be mentioned diamines of the general formula $H_2N(CH_2)_mNH_2$ wherein $m$ is an integer of from 2 to 12, such as trimethylenediamine, tetramethylenediamine, pentamethylenediamine, octamethylenediamine and, above all, hexamethylenediamine.

As examples of the said dicarboxylic acids there may be mentioned terephthalic acid and isophthalic acid, and preferably the dicarboxylic acids of the formula HOOC.Y.COOH wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

If desired other ingredients which are commonly added during the formation of polyamides, for example delustrants such as titanium dioxide, fillers such as powdered glass, asbestos or mica, light stabilisers such as manganese salt, heat stabilisers such as copper salts and iodides, and molecular weight regulators such as acetic acid, can be added at the beginning of, during, or at the end of the polymerisation process of the present invention.

The polyamides obtained by the process of the present invention have excellent colour, being much whiter than similar polymers prepared in the absence of an organic diamine salt of a phosphonic acid. It is also found that carrying out the polymerisation of the polyamide-forming components in the presence of the said salts results in the formation of polymers of higher molecular weight than would otherwise be obtained in the absence of said salts, and this is of particular importance since, although polymers of similar high molecular weight are known these have previously been obtained by increasing the length of the polymerisation cycle which is liable to result in increased degradation of the polymers or by using specialised equipment, or by subsequent solid phase post polymerisation.

It is also found that if a preformed polyamide polymer, for example polyhexamethylene adipamide, is melted and heated with an organic diamine salt of a phosphonic acid the molecular weight of the said polymer is increased to a much greater extent than would normally be obtained by melting and heating the polymer in the absence of said salt, and this forms a further feature of the present invention. If desired instead of using a mixture of a preformed polyamide polymer and the said diamine salt there can be used a polyamide polymer which already includes a said diamine salt.

This process for increasing the molecular weight of preformed polyamides can be conveniently carried out by heating a mixture of the polyamide and the organic diamine salt of the phosphonic acid to above the melting point of the mixture, in the absence of air, for example by carrying out the process under an atmosphere of an inert gas such as nitrogen or in a vacuum, until the required increase in molecular weight has been obtained. This process of the invention can advantageously be carried out in a melt-extruder which operates at reduced pressures. By this process it has been found possible to readily obtain polyamides having extremely high relative viscosities, for example polyhexamethyleneadipamides having relative viscosities in the region of 90 to 100, and such polyamides are particularly useful in the production of extruded articles of wide cross-section.

The polyamides produced by the process of the invention can if desired by converted into fibres by any of the conventional methods of producing fibres from polymers, for example, by melt spinning, and the resulting fibres then used in conventional manner.

A preferred class of polyamides obtained by the process of the invention comprises those polyamides which are obtained by adding to the polymerisation mixture from 0.1 to 4 molar per cent, based on the molecular weight of the recurring units of the polyamide chain, of a salt comprising one molecular proportion of an organic diamine and one molecular proportion of a phosphonic acid of the formula

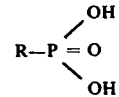

wherein R has the meaning stated above, or the corresponding amounts of the organic diamine and phosphonic acid. Fibres prepared from the preferred class of polyamides have excellent affinity for acid dyestuffs, even when the acid dyestuffs are applied from alkaline dyebaths, and their affinity for acid dyestuffs is much greater than that of fibres prepared from the corresponding polymers which were prepared in the absence of the said salt of phosphonic acid and the organic diamine.

The phosphonic acid does not form an integral part of the polymer chain which consists of recurring —NH-CO— groups separated from each other by a chain of at least 2 carbon atoms, and although its presence, in the form of a salt with the organic diamine, does not have a deleterious effect on the resulting polymer, it is readily removed by subsequent washing of the polymer or during subsequent treatment of the fibres in an aqueous bath, for example during dyeing of the fibres. Surprisingly, it is found that the dye uptake of fibres prepared from the polymers of the invention is not reduced if the phosphonic acid is removed by washing prior to dyeing of the fibres. Since fibres prepared from the preferred polymers of the invention have improved affinity for acid dyestuffs it is usually unnecessary to introduce into the polymers other agents, such as N:N-bis-(3-aminopropyl)piperazine and N-($\beta$-aminoethyl)-piperazine, which are known to improve dye uptake, but, if desired, such agents can be introduced at the polymerisation stage.

The invention is illustrated, but not limited, by the following Examples in which the parts and percentages are by weight.

EXAMPLE 1

100 parts of hexamethylenediammonium adipate, 0.65 part of phenylphosphonic acid, 0.48 part of hexamethylenediamine and 65 parts of water are charged to a stainless steel autoclave, which is then heated to 100°C. The autoclave is purged with steam, then closed, and heating is continued until a pressure of 250 pounds per sq. inc. (p.s.i.) and a temperature of 220°C. is obtained. Heating is then continued until a temperature of 240°C. is obtained whilst the pressure is maintained at 250 p.s.i. by a slow release of steam from the autoclave. The pressure in the autoclave is then slowly reduced to atmospheric pressure while the temperature is raised to 270°C. After 65 minutes at this temperature the polymer is discharged from the autoclave and converted by melt-spinning into fibres.

These fibres have a much higher affinity for the acid dyestuff, Solway Blue BN (C.I. Acid Blue 45) than fibres obtained from a polymer which was prepared as described above except that the phosphonic acid and hexamethylenediamine (HMD) were omitted from the autoclave, as shown by the following Table which gives the % dye uptake of Solway Blue BN on the two types of fibre at varying dyebath pH's.

|  | pH of Dyebath | % Dye Uptake |
|---|---|---|
| Fibre from polymer prepared in the presence of phenylphosphonic acid and HMD | 4.0 | 7.0 |
|  | 7.0 | 3.3 |
|  | 9.0 | 1.0 |
| Fibre from polymer prepared in the absence of phenylphosphonic acid and HMD | 4.0 | 1.5 |
|  | 7.0 | 0.5 |
|  | 9.0 | 0.0 |

EXAMPLE 2

5240 parts of hexamethylene diammonium adipate, 22.6 parts of cyclohexyl phosphonic acid, 15.99 parts of hexamethylene diamine, 6 parts of glacial acetic acid, and 2500 parts of water are heated in a stainless steel autoclave with stirring to 100°C. The autoclave is purged with steam and then closed. Heating is continued until the pressure reaches 250 p.s.i. and the temperature 210°C. Heating is continued, maintaining the pressure at 250 p.s.i. by slow release of steam, until the temperature reaches 235°C. Pressure is then slowly reduced to atmospheric while the temperature rises to 273°C. over 60 minutes. These final conditions are maintained for 10 minutes. The polymer is extruded under inert gas pressure in the form of a ribbon, quenched, chipped and dried. Melt-spinning of the chip produces yarn of satisfactory physical properties.

The dye uptakes of fibres prepared from this polymer from dyebaths containing Solway Blue BN at pH's of 4.0, 7.0 and 9.0 are 6.9, 3.3 and 1.1% respectively, compared with 1.5, 0.5 and 0.0% respectively for fibres prepared as described in this Example except that the cyclohexylphosphonic acid and hexamethylenediamine were omitted from the autoclave.

EXAMPLE 3

A mixture of 100 parts of hexamethylene diammonium adipate, 0.65 part of phenylphosphonic acid, 0.48 part of hexamethylenediamine, 0.65 part of N:N'-bis(3-aminopropyl)piperazine, 0.46 part of adipic acid and 65.0 parts of water is polymerised using the conditions described in Example 1. The resulting polymer is then converted into fibres by known methods. The dye uptake of these fibres from dyebaths containing Solway Blue BN at pH's of 4.0, 7.0 and 9.0 are 8.4%, 4.7% and 1.5% respectively, compared with 4.2%, 0.6% and 0.1% for fibres prepared as described in this Example except that the phenylphosphonic acid and hexamethylenediamine were omitted from the mixture.

A polyamide of similar properties is obtained by replacing the 0.65 part of N:N'-bis(3-aminopropyl)piperazine by an equal weight of N-(2-aminoethyl)piperazine.

EXAMPLE 4

In place of the 0.65 part of phenylphosphonic acid and 0.48 part of hexamethylenediamine used in Example 1 there are used a. 0.86 part of $\beta$-phenylvinylphosphonic acid and 0.54 part of hexamethylenediamine, or b. 0.43 part of $\beta$-phenylethylphosphonic acid and 0.27 part of hexamethylenediamine, or c. 0.86 part of p-chlorophenylphosphonic acid and 0.51 part of hexamethylenediamine, or d. 0.86 part of p-tolylphosphonic acid and 0.58 part of hexamethylenediamine, whereby fibres are obtained which all have a higher affinity for the acid dyestuff, Solway Blue BN, than fibres which were prepared in the absence of said quantities of the phosphonic acids and hexamethylenediamine.

EXAMPLE 5

5240 parts of hexamethylene diammonium adipate, 22.6 parts of cyclohexyl phosphonic acid, 15.99 parts of hexamethylene diamine, 226 parts of caprolactam, 6 parts of glacial acetic acid and 2500 parts of water are heated in a stainless steel autoclave with stirring, to 100°C. The autoclave is purged with steam and then closed. Heating is continued until the pressure reaches 250 p.s.i. and the temperature 210°C. Heating is continued, maintaining the pressure at 250 p.s.i. by slow release of steam, until the temperature reaches 235°C. Pressure is then slowly released to atmospheric while the temperature rises to 273°C. over 60 minutes. These final conditions are maintained for 10 minutes. The polymer is extruded under inert gas pressure in the form of a ribbon, quenched, chipped and dried.

The resulting polymer is much whiter in colour than a polymer which was obtained as described above except that the 22.6 parts of cyclohexylphosphonic acid were omitted from the autoclave.

EXAMPLE 6

5240 parts of caprolactam, 45.2 parts of cyclohexyl phosphonic acid, 23.2 parts of hexamethylenediamine and 2500 parts of water are charged to a stainless steel autoclave, which is then heated to 100°C. The autoclave is purged with steam, then closed, and heating is continued until a pressure of 250 p.s.i. and a temperature of 210°C. is obtained. Heating is then continued until a temperature of 235°C. is obtained whilst the pressure is maintained at 250 p.s.i. by a slow release of steam from the autoclave. The pressure in the autoclave is then slowly reduced to atmospheric pressure whilst the temperature is raised to 260°C. After 10 minutes at this temperature the polymer is discharged from the autoclave and converted by melt-spinning into fibres.

These fibres have a much higher affinity for the acid dyestuff, Solway Blue BN then fibres obtained from a polymer which was prepared as described above except that the cyclohexyl phosphonic acid and hexamethylenediamine were omitted from the autoclave.

EXAMPLE 7

In place of the 22.6 parts of cyclohexylphosphonic acid and 15.99 parts of hexamethylenediamine used in Example 2 there are used 61.4 parts of hexamethylenediamine di-(cyclohexylphosphonate).

The resulting polymer which has a relative viscosity of 51.8 is much whiter in colour than the polymer similarly prepared in the absence of the hexamethylenediamine di-(cyclohexylphosphonate) and this latter polymer is of lower molecular weight as shown by the lower relative viscosity of 45.2 (8.4% solution in 90% formic acid at 25°C.).

EXAMPLE 8

5240 parts of hexamethylene diammonium adipate, 22.6 parts of cyclohexyl phosphonic acid, 6 parts of glacial acetic acid and 2500 parts of water are heated in a stainless steel autoclave with stirring, to 100°C. The autoclave is purged with steam and then closed. Heating is continued until the pressure reaches 250 p.s.i. and the temperature 210°C. Heating is continued, maintaining the pressure at 250 p.s.i. by slow release of steam, until the temperature reaches 235°C. Pressure is then slowly reduced to atmospheric while the temperature rises to 273°C. over 60 minutes. These final conditions are maintained for 10 minutes. The polymer is extruded under inert gas pressure in the form of a ribbon, quenched, chipped and dried.

The resulting polymer is much whiter in colour than the polymer prepared in the absence of the cyclohexyl phosphonic acid, and the molecular weight of the polymer (containing the cyclohexyl phosphonic acid) is much higher as shown by an increase in relative viscosity of 10.1 units from 45.2 to 55.3.

EXAMPLE 9

70 parts of polyhexamethylene adipamide of relative viscosity 36.9 are melted under an atmosphere of nitrogen. 1.2 parts of hexamethylenediamine di-(cyclohexyl phosphonate) are added and the mixture stirred for 10 minutes at 295°C. The mixture is then cooled. The resulting polymer, which has an improved affinity for acid dyestuffs, has a relative viscosity of 53.2, whereas the relative viscosity of the original polymer after being heated for 10 minutes at 295°C. in the absence of the said amine salt had only risen to 40.9.

EXAMPLE 10

A mixture of 30 parts of hexamethylene diammonium adipate, 0.29 part of 1:4-butane diphosphonic acid, 0.137 part of hexamethylenediamine and 2.0 parts of water is heated for 4 hours at 220°C. in a sealed container from which all the air has been displaced by nitrogen. The container is then opened and heating continued for a further hour at 290°C. under an atmosphere of steam. The resulting polyamide is converted into chip form and dried.

The resulting polyamide has a higher molecular weight than a polyamide similarly prepared except that the 1:4-butane diphosphonic acid and hexamethylenediamine were omitted from the charge, as shown by the higher relative viscosity of 57.0 as against 41.2 (8.4% solution in 90% formic acid at 25°C.), and has a higher affinity for the dyestuff Solway Blue BN when applied from an aqueous dyebath at pH's of 4 and 8.

EXAMPLE 11

In place of the 0.29 part of 1:4-butane diphosphonic acid and 0.137 part of hexamethylenediamine used in Example 10 there are used the quantities of the phosphonic acids and the organic diamines listed in the first and second columns of the following Table whereby polyamides are obtained having the relative viscosities listed in the third column of the Table.

| Phosphonic Acid | Organic Diamine | Relative Viscosity |
|---|---|---|
| 0.145 part of 1:4-butane-diphosphonic acid | 0.069 part of hexamethylenediamine | 50.1 |
| 0.36 part of diphenyl 4:4'-diphosphonic acid | " | 56.3 |
| 0.36 part of n-pentane 1:3:5-triphosphonic acid | 0.21 part of hexamethylenediamine | 54.7 |

EXAMPLE 12

In place of the 0.65 part of phenylphosphonic acid and 0.48 part of hexamethylenediamine used in Example 1 there are used the quantities of the phosphonic acids and the organic diamines listed in the following Table whereby similar results are obtained.

| | Phosphonic Acid | Organic Diamine |
|---|---|---|
| a | 0.86 part of methylphosphonic acid | 1.4 part of hexamethylenediamine |
| b | 0.86 part of 1-piperidino-phosphonic acid | 0.6 part of hexamethylenediamine |
| c | 0.86 part of n-butylphosphonic acid | 0.72 part of hexamethylenediamine |
| d | 0.86 part of β-(ethylamino)-ethylphosphonic acid | 0.65 part of hexamethylenediamine |
| e | 0.86 part of cyclohexyl-phosphonic acid | 0.68 part of heptamethylenediamine |
| f | 0.86 part of cyclohexyl-phosphonic acid | 0.90 part of decamethylene diamine |
| g | 0.86 part of cyclohexyl-phosphonic acid | 0.59 part of 1:4-diazabi-cyclo-[2:2:2]-octane |

The relative viscosities of the polyamides obtained in (c) and (d) are 53.2 and 51.6 respectively compared with a value of 44.7 for a control prepared in the absence of said quantities of phosphonic acid and organic diamine.

EXAMPLE 13

5240 parts of hexamethylene diammonium adipate, 52.4 parts of cyclohexyl phosphonic acid, 0.74 parts of cupric acetate, 12.37 parts of a 55% aqueous solution of hydriodic acid, 20.8 parts of hexamethylenediamine and 2500 parts of water are charged to a stainless steel autoclave, which is then heated to 100°C. The autoclave is purged with steam, then closed, and heating is continued until a pressure of 250 p.s.i. and a temperature of 210°C. is obtained. Heating is then continued until a temperature of 235°C. is obtained whilst the pressure is maintained at 250 p.s.i. by a slow release of steam from the autoclave. The pressure in the autoclave is then slowly reduced to atmospheric pressure whilst the temperature is raised to 270°C. After 10 minutes at this temperature the polymer is discharged from the autoclave in the form of a ribbon, quenched, chipped and dried.

The resulting polymer is much whiter in colour than the polymer prepared in the absence of the cyclohexyl phosphonic acid, and the molecular weight of the polymer (containing the cyclohexyl phosphonic acid) is much higher as shown by an increase in relative viscosity of 5.3 units from 46.6 to 51.9.

EXAMPLE 14

5240 parts of hexamethylene diammonium adipate, 9.04 parts of cyclohexyl phosphonic acid, 6.4 parts of hexamethylenediamine, 6.0 parts of glacial acetic acid and 2500 parts of water are heated in a stainless steel autoclave with stirring to 100°C. The autoclave is purged with steam and then closed. Heating is continued until the pressure reaches 250 p.s.i. and the temperature 210°C. Heating is continued, maintaining the pressure at 250 p.s.i. by slow release of steam, until the temperature reaches 235°C. Pressure is then slowly reduced to atmospheric while the temperature rises to 273°C. over 60 minutes. These final conditions are maintained for 10 minutes. The polymer is extruded under inert gas pressure in the form of a ribbon, quenched, chipped and dried.

The resulting polymer has a relative viscosity of 42.7 compared with a relative viscosity of 34.8 for a polymer similarly prepared but omitting the cyclohexylphosphonic acid and hexamethylenediamine.

EXAMPLE 15

A mixture of 56 parts of caprolactam, 0.6 part of the salt of two molecular proportions of cyclohexylphosphonic acid with one molecular proportion of hexamethylenediamine and 10 parts of water is heated for 6 hours at 225° to 230°C. in an atmosphere of nitrogen. A hard white polymer is thereby obtained.

EXAMPLE 16

A mixture of 70 parts of capryllactam, 1.4 parts of the salt of two molecular proportions of cyclohexylphosphonic acid with one molecular proportion of hexamethylenediamine and 10 parts of water is heated for 6 hours at 250°C. in an atmosphere of nitrogen. A hard white polymer is thereby obtained.

EXAMPLE 17

A mixture of 50 parts of dodecanolactam, 0.5 part of the salt of two molecular proportions of cyclohexylphosphonic acid with one molecular proportion of hexamethylenediamine and 10 parts of water is heated for 5 hours at 260°C. in an atmosphere of nitrogen. A hard white polymer is thereby obtained.

A similar polyamide is obtained when the 10 parts of water used in this Example are replaced by 40 parts of benzene.

EXAMPLE 18

Polyhexamethylene adipamide containing 1 mol per cent of cyclohexylphosphonic acid (which was added to the polymerisation autoclave in the form of a salt with hexamethylenediamine) is passed through a 2 inch screw extruder which is operating under a vacuum of 28 inches of mercury at a vent temperature of 250°C., and a screw speed of 60 r.p.m., the throughput of the polyamide being varied by using a vibrating screw feeder for the polyamide. The following Table lists the residence time of the polyamide in the extruder and the inherent viscosities of the resulting products.

| Residence time in minutes of the polyamide in the extruder screw | Inherent viscosity (½% solution in 90% formic acid) |
|---|---|
| 0 | 0.93 |
| 2 | 1.0 |
| 3 | 1.2 |
| 4 | 1.3 |
| 5 | 1.4 |

The inherent viscosity of a polyhexamethyleneadipamide which did not contain any cyclohexylphosphonic acid did not increase when it was similarly passed through the screw extruder.

EXAMPLE 19

An aqueous solution containing 47% of hexamethylene diammonium adipate, 0.57% of hexamethylenediamine and 0.19% of cyclohexylphosphonic acid is pumped through an austentic steel tube, in the form of a coil, comprising 56 meters of tube 3.8 mms. internal diameter, followed by 3 meters of 9.7 mms. internal diameter, 3 meters of 12.7 mms. internal diameter and finally 15 meters of 24.2 mms. internal diameter, the tube being maintained at a temperature of 290°C. The pressure at the inlet end of the tube is 22 atmospheres, whilst the outlet end of the tube is inside a vessel which is also maintained at 290°C., and the internal pressure of which is substantially atmospheric. Polyhexamethyleneadipamide of relative viscosity 51 (8.4% solution in 90% formic acid at 25°C.) is thereby continuously produced at the rate of 3.8 kgs. per hour.

If the 0.18% of cyclohexylphosphonic acid is omitted from the said aqueous solution a polyhexamethyleneadipamide having a relative viscosity of 38 is obtained.

We claim:
1. A polyamide comprising recurring carbonamide groups separated from each other by 2 to 18 carbon atoms and 0.1 to 10 molar percent based on the molecular weight of the recurring units of the polyamide chain, of a salt of an organic diamine of 2 to 18 carbon atoms between amino groups with a phosphonic acid of the formula:

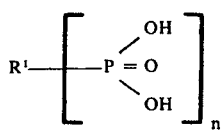

wherein $R^1$ is an n-valent organic alkyl, cycloalkyl, aryl or aralkyl radical and $n$ is an integer of from 1 to 3, said phosphonic acid salt being the predominate phosphorus material by molar percent.

2. The composition of claim 1 including the addition of a stabilizing amount of a copper salt and an iodide.

3. The composition of claim 2 wherein the copper salt is cupric acetate.

4. The composition of claim 1 in the form of a filament.

5. The composition of claim 4 in the form of a filament wherein the polyamide is polyhexamethyleneadipamide and the salt is hexamethylene diammonium phenylphosphonate.

6. The composition of claim 1 wherein the phosphonic acid is a lower alkyl phosphonic acid.

7. The composition of claim 1 wherein the phosphonic acid is cyclohexylphosphonic acid.

8. The composition of claim 1 wherein the phosphonic acid is a monocyclic aryl phosphonic acid.

9. The composition of claim 1 wherein the phosphonic acid is phenylphosphonic acid.

10. The composition of claim 1 wherein the organic diamine is hexamethylenediamine.

11. The composition of claim 1 wherein the polyamide is polycaprolactam.

12. The composition of claim 1 wherein the polyamide is polyhexamethyleneadipamide.

13. Process for the manufacture of polyamides which comprises polymerising at elevated temperatures a polyamide-forming material selected from the group consisting of
   a. monoaminomonocarboxylic acids, and the corresponding lactams, having at least two carbon atoms between the amino and carboxylic acids, and
   b. substantially equimolecular proportions of a diamine having at least two carbon atoms between the amino groups and a dicarboxylic acid having at least two carbon atoms between the carboxylic acid groups, in the presence of from 0.1 to 10.0 molar percent, based on the molecular weight of the recurring units of the polyamide chain, of a salt of an organic diamine of 2 to 18 carbon atoms between amine groups with a phosphonic acid of the formula:

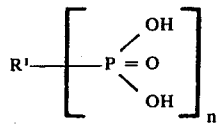

wherein $R^1$ is an n-valent organic alkyl, cycloalkyl, aryl or aralkyl radical and $n$ is an integer of from 1 to 3.

14. The polyamide produced by the process of claim 13.

15. The polyamide produced by the process of claim 13 in the form of a filament.

16. The process of claim 13 wherein a stabilizing amount of a copper salt and an iodide are added to the polyamide-forming material.

17. The process of claim 16 wherein the copper salt is cupric acetate.

18. Process as claimed in claim 13 wherein caprolactam is polymerised in the presence of from 0.1 to 10.0 molar per cent, based on the molecular weight of the recurring units of the polyamide chain, of a salt of an organic diamine with a phosphonic acid of the formula:

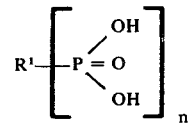

wherein $R^1$ is an $n$-valent organic radical and $n$ is an integer of from 1 to 3.

19. Process as claimed in claim 13 wherein substantially equimolecular proportions of adipic acid and hexamethylenediamine are polymerised in the presence of from 0.1 to 10.0 molar per cent, based on the molecular weight of the recurring units of the polyamide chain, of a salt of an organic diamine with a phosphonic acid of the formula:

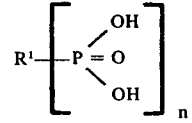

wherein $R^1$ is an $n$-valent organic radical and $n$ is an integer of from 1 to 3.

20. Process as claimed in claim 13 wherein the phosphonic acid is a lower alkylphosphonic acid.

21. Process as claimed in claim 13 wherein the phosphonic acid is cyclohexylphosphonic acid.

22. Process as claimed in claim 13 wherein the phosphonic acid is a monocyclic arylphosphonic acid.

23. Process as claimed in claim 13 wherein the organic diamine is hexamethylenediamine.

24. Process as claimed in claim 13 wherein the salt of the organic diamine with the phosphonic acid is added after formation of the polyamide and the resulting mixture is heated above the melting point of the mixture to effect further polymerization.

* * * * *